Dec. 26, 1961  H. A. HALLETT  3,014,372
PNEUMATIC FORCE-BALANCE SIGNAL TRANSMITTERS
Filed June 26, 1956
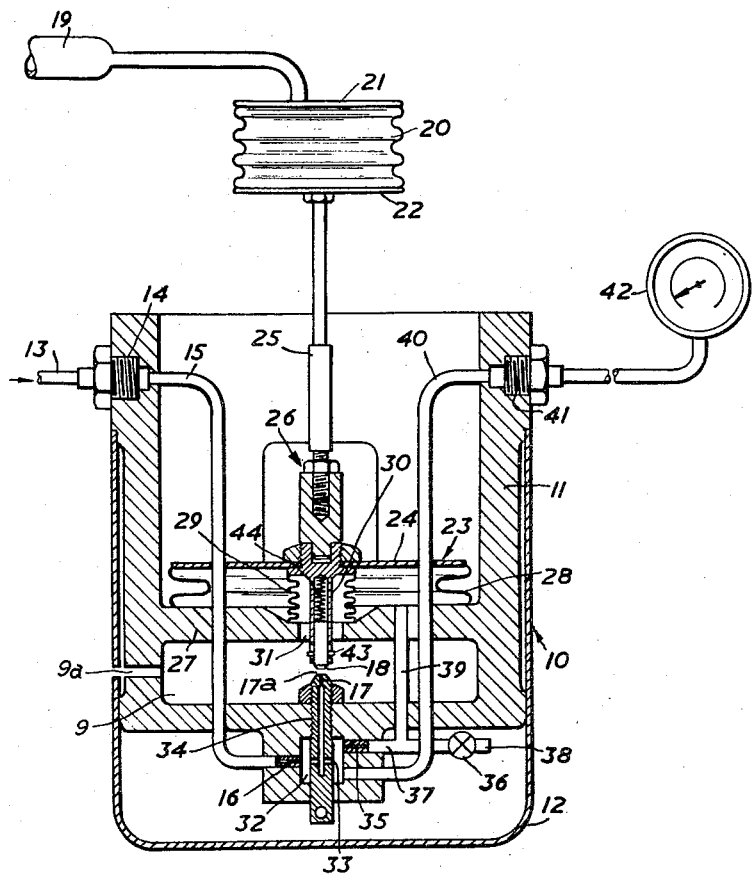
INVENTOR
HENRY ALBERT HALLETT
BY Young, Emery & Thompson
ATTORNEYS United States Patent Office 3,014,372
Patented Dec. 26, 1961

3,014,372
PNEUMATIC FORCE-BALANCE SIGNAL
TRANSMITTERS
Henry Albert Hallett, Cheltenham, England, assignor to Cheltenham Auto Controls Limited, Cheltenham, England, a British company
Filed June 26, 1956, Ser. No. 593,956
Claims priority, application Great Britain July 5, 1955
14 Claims. (Cl. 73—407)

This invention relates to pneumatic force-balance signal transmitters, that is to say to devices in which a force generated by some condition or property of a variable, for example a temperature, pressure, flow rate, liquid level or other process variable, is balanced by a force due to pressure of a gaseous fluid, usually air, which accordingly varies proportionally with the varying value being measured. The input signal, therefore, which is the measurement of the aforesaid variable, results in an output signal which is a gas pressure having a value directly proportional to the input signal and is transmitted to afford an indication, recording, control or the like of the variable at a distance.

Such force-balance signal transmitters comprise a diaphragm, bellows, piston or like element subject to the balancing gas pressure and, for convenience of manufacture, this element is usually made of a given size, irrespective of the value of the input force, and it may therefore generate a counteracting force greater or less than such input force. Accordingly the link between the input force and the balancing force has to be adjustable and hitherto this link has taken the form of a lever device such that adjustment of the position of the fulcrum relatively to the points of application of the two forces enables them to be balanced.

The main object of the present invention is to provide an improved pneumatic force-balance signal transmitter which will be free from certain disadvantages and limitations inherent in the lever type of instrument.

According to the invention, instead of the balancing gas pressure being necessarily equal to that of the output signal, in order to achieve the foregoing object a balancing force is applied in direct opposition to the input force, balance being obtained by proportioning the amount of balancing gas pressure applied, while the gas pressure of the output signal is proportional to said balancing gas pressure.

Although in one form of the invention said balancing gas pressure may be the differential of two gas pressures each higher than that at the outlet nozzle of the device, preferably the balancing gas pressure is the differential between atmospheric pressure and a pressure the same as, or lower than, that at the outlet nozzle of the device.

By means of the invention a pneumatic force-balance transmitter is provided which may be made smaller and more compact than the lever type of device, which is moreover free from the friction, weight and inertia of the lever system, which suffers less disturbance from outside vibration and can be mounted in positions other than vertical. Finally the device in its preferred form may be very considerably more sensitive and have a much wider range than has been possible with the known devices.

One constructional form of pneumatic force-balance signal transmitter constructed in accordance with the invention will now be described, by way of example, with reference to the accompanying drawing, the single figure of which illustrates in diagrammatic section the signal transmitter and the means by which the input signal is produced, the figure also showing means, which may be remote from the signal transmitter, by which the order of the output signal can be observed or recorded.

Referring to the drawing, the signal transmitter 10 shown therein comprises a body 11 provided wtih a detachable cover 12. Within the body 11 a discharge chamber 9 is arranged which is vented to atmosphere by way of an inlet 9a. Compressed air at a controlled pressure from an external source of supply is passed to the device 10 through a supply line 13 which is coupled to an inlet 14 formed in the body 11. From the inlet 14 the pressure air is fed by way of a pipe 15 through a restrictor 16 to a nozzle 17, the escape rate through the nozzle being regulated by the proximity to the nozzle of a throttling plug or tip 18, all in the usual manner. However, instead of the throttling plug 18 being carried by a lever to which the input and balancing forces are applied, these forces are applied in direct opposition to each other and the throttling plug moves with the balancing element to open and close the nozzle gap 17a. Air escaping from the nozzle 17 enters the discharge chamber 9 and passes thence freely to atmosphere through the outlet 9a.

Considering the application of the device 10 to the remote indication of the temperature of the contents of a vat or the like, not illustrated, the temperature measurement constituting the input signal may be effected by a vapour-pressure or gas-filled bulb 19 which causes expansion of a bellows 20 constituting the input element of the device. One end 21 of the input signal bellows 20 is fixed relatively to the body 11 of the device whilst the opposite end 22 is free to move towards the latter under expansion of the bellows. The input force resulting from such movement of the end 22 of the input signal bellows 20 is applied directly to a balancing element, which in the embodiment illustrated is in the form of a movable end 24 of a balancing bellows 23 directly connected to the end 22 of the input signal bellows 20 by a rod 25 extending axially of the input and balancing bellows 20, 23 and provided with screw adjustment means 26. At the end opposite to its movable end 24 the balancing bellows 23 is closed by a transverse wall 27 of the body 11, the bellows further comprising flexible corrugated outer and inner elements 28, 29 concentrically arranged. An extension 30 of the rod 25 passes axially through the cylindrical inner element 29 of the balancing bellows 23 and an aperture 31 formed in the wall 27, such extension being hollow and detachably carrying at the end adjacent the nozzle 17 the aforesaid throttling plug 18 which lies close to the nozzle and in alignment therewith.

The pressure air fed through the pipe 15 and restrictor 16 passes into a chamber 32 which surrounds a lower portion of the nozzle 17, air passing from the chamber into the axial bore of the nozzle through transverse passages 33 formed in the nozzle. Preferably, and as illustrated, the nozzle 17 is provided with a threaded upper portion which engages with a tapped bore 34 formed axially in the body and leading from the chamber 32 so that the nozzle can be removed from the body 11 for replacement or cleaning purposes. The pressure air passing through the restrictor 16 into the chamber 32 only partially escapes from the nozzle 17, two further restrictors 35, 36 being arranged in series with the first restrictor 16 and disposed in a channel 37 for the escape of air from the chamber 32, i.e. from the upstream or pressure side of the nozzle 17, to atmosphere through a further outlet 38 on the downstream side of the third restrictor 36. In the embodiment illustrated the third restrictor 36 is variable and, if desired, the second restrictor 35 may also be of the variable type. It will be seen that the axial bore of the nozzle 17 forms a tapping between the first and second restrictors 16, 35.

A tapping 39 is taken from a point in the channel 37 between the second and third restrictors 35, 36 to the balancing bellows 23 so that the latter is fed with the pressure at that point, which due to the interposition of the second restrictor 35 will always be lower than the pressure at the nozzle 17 or, with the third restrictor 36 closed, the same as that at the nozzle. It will be appreciated that as the third restrictor 36 is adjusted towards its closed position the pressure between the second and third restrictors 35, 36 builds up and approaches the order of the pressure at the nozzle. The pressure in the chamber 32 between the first and second restrictors 16, 35 is fed not only to the nozzle 17 but also through a pipe 40 and outlet 41 formed in the body 11 to the remote instrument 42 to which the signal is to be transmitted. Such instrument may be an indicator or recorder, as illustrated, or alternatively an automatic process controller.

The operation of the device is as follows. The output pressure at the downstream end of the first restrictor 16, i.e. the pressure in the chamber 32, is governed by the gap 17a at the nozzle 17. As the pressure drop across the restrictor 16 is related to the rate of flow through it, a decrease in the pressure drop is related to a reduced air flow effected by reduction of the nozzle gap 17a. The resulting increase in pressure in the chamber 32 at the tapping point to the nozzle 17 involves a higher rate of flow through the second and third restrictors 35, 36 and, since the pressure at the downstream end of the latter is virtually atmospheric, increased flow occurs which results in an increased pressure at the downstream end of the second restrictor 35, such increased pressure being proportional to the pressure in the chamber 32 at the tapping point to the nozzle. As already stated, this increased pressure is fed to the balancing bellows 23. Consequently it will be seen that, as the nozzle gap 17a tends to close under an increase in input force exerted on the rod 25, the pressure at the tapping point to the nozzle 17 increases and the pressure fed to the balancing bellows 23 increases proportionally thereto.

In order to prevent damage to the nozzle 17 in the event of excessive input pressure forcing the throttling plug or tip 18 thereagainst, the latter is held in position in the bore in the extension 30 by a transverse pin 43 carried in longitudinal slots formed in the extension, the pin being held against the lower end of such slots by a compression spring 44 arranged axially in the bore so that the throttling plug can move upwardly in the latter against the loading of the spring if forced against the end of the nozzle.

I claim:

1. A pneumatic force-balance signal transmitter comprising in combination a balancing element, means for applying an input force to said balancing element, means for applying a balancing force to said balancing element in opposition to said input force, said balancing element being mounted for translating movement under the influence of said forces to a balance position, proportioning means responsive to the position of said balancing element to provide a pneumatic pressure proportional to said input force, further proportioning means to proportion said pneumatic pressure to provide a further pneumatic pressure, and means connecting one of said pressures to said pneumatic balancing means whilst the other provides a pneumatic output signal.

2. A transmitter according to claim 1, the arrangement being such that said further pneumatic pressure provides said balancing force and the other pneumatic pressure provides said output signal.

3. A transmitter according to claim 1, wherein said means for applying a balancing force comprise a source of controlled pressure air and said further proportioning means comprise an adjustable restrictor providing a bleed to atmosphere.

4. A transmitter according to claim 1, wherein said further proportioning means comprise an adjustable restrictor and said balancing force is applied to said balancing element in direct opposition to said input force.

5. A transmitter according to claim 4, wherein said adjustable restrictor has a limit position at which said two pneumatic pressures are equal.

6. A pneumatic force-balance signal transmitter comprising in combination a balancing element, means for applying an input force to said balancing element, means for applying a balancing force to said balancing element in opposition to said input force, said balancing element being mounted for translating movement under the influence of said forces to a balance position, proportioning means responsive to the position of said balancing element to provide a pneumatic pressure proportional to said input force, adjustable proportioning means to proportion said pneumatic pressure to provide a further pneumatic pressure, and means connecting one of said pressures to said pneumatic balancing means whilst the other provides a pneumatic output signal.

7. A transmitter according to claim 6, wherein said means for applying a balancing force comprise an outlet nozzle, arranged to discharge to atmosphere, a restrictor adapted to supply said nozzle from a source of controlled pressure air, and means for throttling said nozzle in dependence upon movement of said balancing element.

8. A transmitter according to claim 7, wherein said means for throttling said nozzle comprise a throttling plug carried by said balancing element and arranged adjacent said outlet nozzle, movement of said throttling plug towards and away from said outlet nozzle effecting throttling of the latter.

9. A pneumatic force-balance signal transmitter comprising a source of controlled pressure air, a bellows having a movable balancing element, a conduit communicating said source with said bellows, means to apply a variable signal force directly to said balancing element to provide a tendency for movement thereof, means to apply a fluid balancing pressure to said bellows to directly oppose said signal force and provide a tendency for translatory movement of said balancing element in opposition to said tendency for movement due to said signal force, said means to apply said balancing pressure comprising a first flow restrictor and a second flow restrictor in series with each other in said conduit, a branch conduit communicating said conduit on the downstream side of said restrictors with the atmosphere, and a variable flow restrictor in said branch conduit, the transmitter also comprising means to provide an output signal dependent on the value of fluid pressure between said first and second restrictors in said conduit.

10. A transmitter according to claim 9, wherein said source of controlled pressure air comprises an outlet nozzle means and throttling means operated by movement of said balancing element.

11. A pneumatic force-balance signal transmitter comprising an outlet nozzle means opening to atmosphere, a bellows having a movable plate, throttling means extending axially of said plate and movable towards and away from said nozzle means, means to apply a variable signal force directly to said plate to cause said throttling means to variably throttle said nozzle means, a chamber with which the upstream side of said nozzle means communicates, means including a conduit and a flow restrictor in said conduit to supply fluid under pressure to said chamber, means having a flow restrictor therein communicating said chamber with said bellows, a branch conduit communicating said communicating means on the downstream side of the flow restrictor therein with the atmosphere, a variable flow restrictor in said branch conduit, and means to provide an output signal dependent on the value of fluid pressure in said chamber.

12. A pneumatic force-balance signal transmitter adapted to be connected to a source of pressure air and comprising in combination a balancing element, means for applying an input force to said balancing element, a nozzle discharging to atmosphere, a conduit connected to said source of pressure air to supply pressure air to said nozzle, a restrictor in said conduit, throttling means to variably throttle said nozzle in dependence upon the position of said balancing element, adjustable means to proportion the pressure within the nozzle to apply a balancing force to said element in opposition to said input force, and means whereby said pressure within the nozzle provides a pneumatic output signal.

13. A pneumatic force-balance signal transmitter adapted to be connected to a source of pressure air; comprising in combination a balancing element; means for applying an input force to said balancing element; a nozzle adapted to discharge to atmosphere; a conduit communicating with said source of pressure air to supply pressure air to said nozzle; a restrictor in said conduit; throttling means to variably throttle said nozzle in dependence upon the position of said balancing element; adjustable means comprising a further restrictor fed from the aforesaid restrictor, an adjustable restrictor on the downstream side of said further restrictor through which said further restrictor discharges to atmosphere, and a tapping point between said further restrictor and said adjustable restrictor to provide a proportion of the pressure within the nozzle to apply a balancing force to said balancing element in opposition to said input force; and means whereby said pressure within the nozzle provides a pneumatic output signal.

14. A pneumatic force-balance signal transmitter comprising in combination a balancing element, means for applying an input force to said balancing element, means for applying a pneumatic balancing force to said balancing element in direct opposition to said input force, said balancing element being mounted for translatory movement under the influence of said forces to a balance position, proportioning means responsive to the balance position of said balancing element to provide two pneumatic pressures proportional to said input force and to enable the ratio of said two pneumatic pressures to be adjusted, and means enabling one of said pneumatic pressures to provide said pneumatic balancing force while the other provides a pneumatic output signal.

References Cited in the file of this patent

UNITED STATES PATENTS

| | | |
|---|---|---|
| 2,408,685 | Rosenberger | Oct. 1, 1946 |
| 2,520,468 | Moore | Aug. 29, 1950 |
| 2,535,198 | Matner et al. | Jan. 2, 1951 |
| 2,655,037 | Gess | Oct. 13, 1953 |
| 2,672,151 | Newbold | Mar. 16, 1954 |

FOREIGN PATENTS

| | | |
|---|---|---|
| 1,005,207 | France | Dec. 12, 1951 |

OTHER REFERENCES

"The Solution of Instrumentation Problems by the Pneumatic Null Balance Method," by Moore. Published in Instruments (pages 598–603), vol. 18, September 1945.